(12) United States Patent
Reicher et al.

(10) Patent No.: US 10,282,404 B2
(45) Date of Patent: May 7, 2019

(54) VOICE COMMANDS FOR REPORT EDITING

(71) Applicant: D.R. Systems, Inc., San Diego, CA (US)

(72) Inventors: Murray A. Reicher, Rancho Santa Fe, CA (US); Evan K. Fram, Paradise Valley, AZ (US)

(73) Assignee: D.R. Systems, Inc., San Diego, CA (US)

( * ) Notice: Subject to any disclaimer, the term of this patent is extended or adjusted under 35 U.S.C. 154(b) by 139 days.

(21) Appl. No.: 15/175,704

(22) Filed: Jun. 7, 2016

(65) Prior Publication Data
US 2017/0046320 A1 Feb. 16, 2017

Related U.S. Application Data

(63) Continuation of application No. 14/272,364, filed on May 7, 2014, now Pat. No. 9,390,079.
(Continued)

(51) Int. Cl.
*G06F 17/24* (2006.01)
*G06F 17/20* (2006.01)
(Continued)

(52) U.S. Cl.
CPC .......... *G06F 17/24* (2013.01); *G06F 3/04812* (2013.01); *G06F 3/167* (2013.01); *G10L 15/22* (2013.01); *G10L 2015/223* (2013.01)

(58) Field of Classification Search
USPC ................................................. 704/200–277
See application file for complete search history.

(56) References Cited

U.S. PATENT DOCUMENTS 6,138,098 A * 10/2000 Shieber ................. G06F 17/271
704/257
7,139,031 B1 11/2006 Bray
(Continued)

OTHER PUBLICATIONS

AGFA HealthCare, color brochure "IMPAX 6: Digital Image and Information Management," © 2012 Agfa HealthCare N.V. Downloaded from http://www.agfahealthcare.com/global/en/he/library/libraryopen?ID=32882925. Accessed on Feb. 9, 2015.
(Continued)

*Primary Examiner* — Marcellus J Augustin
(74) *Attorney, Agent, or Firm* — Michael Best & Friedrich LLP

(57) ABSTRACT

A voice command system may enable a user to select, replace, delete, and/or modify items of textual content associated with, or following, headings and/or subheadings of a document by providing an input including a command (or identifier) and a heading/subheading identifier. The system may recognize, via voice recognition software and in combination with a rule set, the command and the identifier. For example, the system may include rules for determining a particular heading/subheading of the document being referenced by the identifier. The system may also include rules for identifying the textual content related to the identified heading/subheading. Once the textual content is identified, the system may automatically select or delete the identified textual content, and/or place a cursor (for example, a text input cursor) in a location where the deleted textual content was previously located.

20 Claims, 12 Drawing Sheets

Related U.S. Application Data

(60) Provisional application No. 61/821,856, filed on May 10, 2013.

(51) Int. Cl.
  G06F 17/27 (2006.01)
  G06F 3/16 (2006.01)
  G10L 15/22 (2006.01)
  G06F 3/0481 (2013.01)

(56) References Cited

U.S. PATENT DOCUMENTS

| | | | | |
|---|---|---|---|---|
| 7,149,983 | B1* | 12/2006 | Robertson | G06F 17/30398 715/810 |
| 7,415,412 | B2 | 8/2008 | Naoi | |
| 7,996,223 | B2* | 8/2011 | Frankel | G06F 17/27 704/231 |
| 8,200,487 | B2* | 6/2012 | Peters | G06F 17/27 704/236 |
| 2002/0010711 | A1* | 1/2002 | Nakanishi | G06F 17/218 715/205 |
| 2002/0135800 | A1 | 9/2002 | Dutta | |
| 2004/0044965 | A1* | 3/2004 | Toyama | G06F 17/2247 715/234 |
| 2004/0172245 | A1* | 9/2004 | Rosen | G06F 17/211 704/235 |
| 2005/0071196 | A1 | 3/2005 | Del Pin | |
| 2005/0114129 | A1 | 5/2005 | Watson | |
| 2005/0197841 | A1* | 9/2005 | Al-Dhubaib | G10L 15/26 704/270 |
| 2006/0190492 | A1* | 8/2006 | Karl | G06F 17/2705 |
| 2007/0162847 | A1 | 7/2007 | Tunning | |
| 2011/0066634 | A1 | 3/2011 | Phillips | |

OTHER PUBLICATIONS

AGFA HealthCare, IMPAX 6.5 Datasheet (US)2012. © 2012 Agfa HealthCare N.V. Downloaded from http://www.agfahealthcare.com/global/en/he/library/libraryopen?ID=37459801. Accessed on Feb. 9, 2015.
AMD Technologies, Inc., Catella PACS 5.0 Viewer User Manual (112 pgs), © 2010, AMD Technologies, Inc. (Doc. 340-3-503 Rev. 01). Downloaded from http://www.amdtechnologies.com/lit/cat5viewer.pdf. Accessed on Feb. 9, 2015.
Aspyra's Imaging Solutions, 3 page color print out. Accessed at http://www.aspyra.com/imaging-solutions. Accessed on Feb. 9, 2015.
Avreo, interWorks—RIS/PACS package, 2 page color brochure, © 2014, Avreo, Inc. (Document MR-5032 Rev. 4). Downloaded from http://www.avreo.com/ProductBrochures/MR-5032Rev.%204interWORKS%20RISPACSPackage.pdf. Accessed on Feb. 9, 2015.
BRIT Systems, BRIT PACS View Viewer, 2 page color brochure, (BPB-BPV-0001). Downloaded from http://www.brit.com/pdfs/britpacsview.pdf. Accessed on Feb. 9, 2015.
BRIT Systems, Roentgen Works—100% Browers-based VNA (Vendor Neutral Archive/PACS), © 2010 BRIT Systems, 1 page color sheet. Accessed at http://www.roentgenworks.com/PACS. Accessed on Feb. 9, 2015.
BRIT Systems, Vision Multi-modality Viewer—with 3D, 2 page color brochure, (BPB-BVV-0001 REVC). Downloaded from http://www.brit.com/pdfs/BPB-BVV-0001REVC_BRIT_Vision_Viewer.pdf. Accessed on Feb. 9, 2015.
CANDELiS, ImageGrid™: Image Management Appliance, 6 page color brochure. (AD-012 Rev. F Nov. 2012), © 2012 Candelis, Inc. Downloaded from http://www.candelis.com/images/pdf/Candelis_ImageGrid_Appliance_20111121.pdf. Accessed on Feb. 9, 2015.
Carestream, Cardiology PACS, 8 page color brochure. (CAT 866 6075 06/12). © Carestream Health, Inc., 2012. Downloaded from http://www.carestream.com/cardioPACS_brochure_M1-877.pdf. Accessed on Feb. 9, 2015.

Carestream, Vue PACS, 8 page color brochure. (CAT 300 1035 05/14). © Carestream Health, Inc., 2014. Downloaded from http://www.carestream.com/csPACS_brochure_M1-876.pdf. Accessed on Feb. 9, 2015.
Cerner, Radiology—Streamline image management, 2 page color brochure, (fl03_332_10_v3). Downloaded from http://www.cerner.com/uploadedFiles/Clinical_Imaging.pdf. Accessed on Feb. 9, 2015.
CoActiv, EXAM-PACS, 2 page color brochure, © 2014 CoActiv, LLC. Downloaded from http://coactiv.com/wp-content/uploads/2013/08/EXAM-PACS-BROCHURE-final-web.pdf. Accessed on Feb. 9, 2015.
DR Systems, Dominator™ Guide for Reading Physicians, Release 8.2, 546 pages, (TCP-000260-A), © 1997-2009, DR Systems, Inc. Downloaded from http://resources.dominator.com/assets/004/6999.pdf. Document accessed Feb. 9, 2015.
DR Systems, DR Scheduler User Guide, Release 8.2, 410 pages, (TCP-000115-A), © 1997-2009, DR Systems, Inc. Downloaded from https://resources.dominator.com/assets/003/6850.pdf. Document accessed Feb. 9, 2015.
Fujifilm Medical Systems, SYNAPSE® Product Data, Synapse Release Version 3.2.1, Foundation Technologies, 4 page color brochure, (XBUSSY084) Aug. 2008. Downloaded from http://www.fujifilmusa.com/shared/bin/foundation.pdf. Accessed on Feb. 9, 2015.
Fujifilm Medical Systems, SYNAPSE® Product Data, Synapse Release Version 3.2.1, Server Modules and Interfaces, 4 page color brochure, (XBUSSY085) Aug. 2008. Downloaded from http://www.fujifilmusa.com/shared/bin/server-interface.pdf. Accessed on Feb. 9, 2015.
Fujifilm Medical Systems, SYNAPSE® Product Data, Synapse Release Version 3.2.1, Workstation Software, 4 page color brochure, (XBUSSY082) Aug. 2008. Downloaded from http://www.fujifilmusa.com/shared/bin/workstation.pdf. Accessed on Feb. 9, 2015.
GE Healthcare, Centricity PACS, in 8 page printout. Accessed at http://www3.gehealthcare.com/en/products/categories/healthcare_it/medical_imaging_informatics_-_ris-pacs-cvis/centricity_pacs. Accessed on Feb. 9, 2015.
Handylife.com—Overview of Handy Patients Enterprise, in 2 page printout. Accessed from http://www.handylife.com/en/software/overview.html. Accessed on Feb. 18, 2015.
Handylife.com—Features of Handy Patients Enterprise, in 4 page printout. Accessed from http://www.handylife.com/en/software/features.html. Accessed on Feb. 18, 2015.
Handylife.com—Screenshots of Handy Patients Enterprise, in 2 page printout. Accessed from http://www.handylife.com/en/software/screenshots.html. Accessed on Feb. 18, 2015.
ICRco, I See the Future, in 12 pages, color brochure, (BR080809AUS), © 2009 iCRco.ClarityPACS. Downloaded from http://www.claritypacs.com/pdfs/ISeeFuture_26_Web.pdf. Accessed on Feb. 9, 2015.
Imageanalysis, dynamika, 2 page color brochure. Downloaded from http://www.imageanalysis.org.uk/what-we-do. Accessed on Feb. 9, 2015.
Imageanalysis, MRI Software, in 5 page printout. Accessed at http://www.imageanalysis.org.uk/mri-software. Accessed on Feb. 9, 2015.
IMSI, Integrated Modular Systems, Inc., Hosted / Cloud PACS in one page printout. Accessed at http://www.imsimed.com/#lproducts-services/ctnu. Accessed on Feb. 9, 2015.
Infinitt, PACS, RIS, Mamma PACS, Cardiology Suite and 3D/Advanced Visualization | Infinittna, 2 page printout. Accessed at http://www.infinittna.com/products/radiology/radiology-pacs. Accessed on Feb. 9, 2015.
Intelerad, IntelePACS, 2 page color brochure, © 2014 Intelerad Medical Systems Incoprorated. Downloaded http://www.intelerad.com/wp-content/uploads/sites/2/2014/08/IntelePACS-brochure.pdf. Accessed on Feb. 9, 2015.
Intelerad, InteleViewer, 2 page color brochure, © 2014 Intelerad Medical Systems Incoprorated. Downloaded from http://www.intelerad.com/wp-content/uploads/sites/2/2014/09/InteleViewer-brochure.pdf. Accessed on Feb. 9, 2015.
Intuitive Imaging Informatics, ImageQube, 1 page in color. Downloaded from http://www.intuitiveimaging.com/2013/pdf/ImageQube%20one-sheet.pdf. Accessed on Feb. 9, 2015.

(56) References Cited

OTHER PUBLICATIONS

Kuhl, Helen: Comparison Chart/PACS, Customers Are Happy, But Looking for More, (color) Imaging Techology News, itnonline.com, May 2012, pp. 24-27. Downloaded from http://www.merge.com/MergeHealthcare/media/company/In%20The%20News/merge-pacs-comparison.pdf. Accessed on Feb. 9, 2015.

LUMEDX CardioPACS 5.0 Web Viewer, Cardiopacs Module, 2 page color brochure, (506-10011 Rev A). Downloaded from http://cdn.medicexchange.com/images/whitepaper/cardiopacs_web_viewer.pdf?1295436926. Accessed on Feb. 9, 2015.

LUMEDX Cardiovascular Information System, CardioPACS, one page in color printout. Accessed at http://www.lumedx..com/pacs.aspx. Accessed on Feb. 9, 2015.

McKesson Enterprise Medical Imagining and PACS | McKesson, 1 page (color) printout. Accessed at http://www.mckesson.com/providers/health-systems/diagnostic-imaging/enterprise-medical-imaging. Accessed on Feb. 9, 2015.

Medweb Radiology Workflow Solutions, Radiology Workflow Solutions, Complete Workflow & Flexible Turnkey Solutions, Web RIS/PACS with Advanced Viewer, 3 page color brochure, © 2006-2014 Medweb. Downloaded from http://www.medweb.com/docs/rispacs_brochure_2014.pdf. Accessed on Feb. 9, 2015.

Merge Radiology Solutions, Merge PACS, A real-time picture archiving communication system, (PAX-21990 rev 2.0), 2 page color brochure. Downloaded from http://www.merge.com/MergeHealthcare/media/docurnents/brochures/Merge_PACS_web.pdf. Accessed on Feb. 9, 2015.

NOVARAD Enterprise Imaging Solutions, NOVAPACS, 2 page (color) printout. Accessed at http://ww1.novarad.net/novapacs. Accessed on Feb. 9, 2015.

PACSPLUS, PACSPLUS Server, 1 page (color) printout. Accessed at http://www.pacsplus.com/01_products/products_01.html. Accessed on Feb. 9, 2015.

PACSPLUS, PACSPLUS Workstation, 3 page (color) printout. Accessed at http://www.pacsplus.com/01_products/products_01.html. Accessed on Feb. 9, 2015.

Philips IntelliSpace PACS, in 2 color page printout. Accessed at https://www.healthcare.philips.com/main/products/healthcare_informatics/products/enterprise_imaging_informatics/isite_pacs. Accessed on Feb. 9, 2015.

Philips, IntelliSpace: Multi-modality tumor tracking application versus manual PACS methods, A time study for Response Evaluation Criteria in Solid Tumors (RECIST). 2012, Koninklijke Philips Electronics N.V., in four pages.

RamSoft, RIS PACS Teleradiology, PowerServer PACS, Lite PACS, XU PACS Compare RamSoft PACS Products, 2 color page printout. Accessed at http://www.ramsoft.com/products/powerserver-pacs-overview. Accessed on Feb. 9, 2015.

Sage Intergy PACS | Product Summary. Enhancing Your Workflow by Delivering Web-based Diagnostic Images When and Where You Need Them, in 2 color pages. (IRV-SS-INTPACS-PSS-031309). © 2009 Sage Software Healcare, Inc. Downloaded from http://www.greenwayhealth.com/solutions/intergy/. Accessed on Feb. 9, 2015.

ScImage, Cardiology PACS, in 8 color page printout. Accessed at http://www.scimage.com/solutions/clinical-solutions/cardiology. Accessed on Feb. 9, 2015.

Sectra RIS PACS, in 2 color page printout. Accessed at http://www.sectra.com/medical/diagnostic_imaging/solutons/ris-pacs/. Accessed on Feb. 9, 2015.

Siemens syngo.plaza, Features and Benefits, in 2 color page printout. Accessed at http://www.healthcare.siemens.com/medical-imaging-it/imaging-it-radiology-image-management-pacs/syngoplaza/features. Accessed on Feb. 9, 2015.

Simms | RIS and PACS Medical Imaging Software, in 2 color page printout. http://www.mysimms.com/ris-pacs.php. Accessed on Feb. 9, 2015.

Stryker, Imaging—OfficePACS Power Digital Imaging, in one color page printout. Accessed from http://www.stryker.com/emea/Solutions/Imaging/OfficePACSPowerDigitalImaging/index.htm. Accessed on Feb. 9, 2015.

Stryker, OfficePACS Power—Digital Imaging, 8 page color brochure, (MPP-022 Rev 4 BC/MP 300 1/07). © 2007 Stryker. Downloaded from http://www.stryker.com/emea/Solutions/Imaging/OfficePACSPowerDigitalImaging/ssLINK/emea/1557/022268. Accessed on Feb. 9, 2015.

UltraRAD—ultra VISION, 1 page (color). Downloaded from http://www.ultraradcorp.com/pdf/UltraVISION.pdf. Accessed on Feb. 9, 2015.

VioStream for VitreaView, 2 color pages printout. Accessed at http://www.vitalimages.com/solutions/unversal-viewing/viostream-for-vitreaview. Accessed on Feb. 9, 2015.

Visage Imaging Visage 7, 3 color page printout. Accessed at http://www.visageimaging.com/visage-7. Accessed on Feb. 9, 2015.

VIZTEK Radiology PACS Software Vixtek Opal-RAD, 4 color page printout. Accessed at http://viztek.net/products/opal-rad. Accessed on Feb. 9, 2015.

Voyager Imaging—Voyager PACS Radiologist Workstation, 2 page color brochure. Downloaded from http://www.intellirad.com.au/assets/Uploads/Voyager-PacsWorkstations.pdf?. Accessed on Feb. 9, 2015.

Voyager Imaging—Voyager PACS, 3 page color brochure. Downloaded from http://www.intellirad.com.au/index.php/assets/Uploads/Voyager-Pacs3.pdf. Accessed on Feb. 9, 2015.

\* cited by examiner

PROCEDURE: CT OF THE NECK WITHOUT CONTRAST

COMPARISON: None.

INDICATIONS: None.

TECHNIQUE: CT images were created without intravenous contrast material.

FINDINGS:

NASOPHARYNX: Normal. Fossae of Rosenmuller and torus tubarius are symmetric.
ORAL CAVITY: Normal. No visible mass.
OROPHARYNX: Normal. Faucial and lingual tonsils are symmetric.
HYPOPHARYNX: Normal. No mass or other visible lesion.
LARYNX: Normal. The vocal cords are symmetric and without mass.
SINUSES: Normal. Limited views show no significant fluid or mucosal thickening.
NECK GLANDS: Normal. The parotid, submandibular, and thyroid glands are unremarkable.
LYMPH NODES: Normal. No pathological-appearing or enlarged lymph nodes.
SKULL BASE: Normal. Foramina are symmetric without bony erosion.
VASCULATURE: Normal. Limited views are unremarkable.
BONES: Normal. No significant osseous lesions.
OTHER: Normal. No additional imaging findings.

CONCLUSION: WARNING: THIS REPORT WAS APPROVED PREMATURELY AND IS NOT ACCURATE. PLEASE CONTACT US IMMEDIATELY.

PROCEDURE: CT OF THE NECK WITHOUT CONTRAST

COMPARISON: None.

INDICATIONS: None.

TECHNIQUE: CT images were created without intravenous contrast material.

FINDINGS:

NASOPHARYNX: Normal. Fossae of Rosenmuller and torus tubarius are symmetric.
ORAL CAVITY: Normal. No visible mass.
OROPHARYNX: Normal. Faucial and lingual tonsils are symmetric.
HYPOPHARYNX: Normal. No mass or other visible lesion.
LARYNX: Normal. The vocal cords are symmetric and without mass.
SINUSES: Normal. Limited views show no significant fluid or mucosal thickening.
NECK GLANDS: Normal. The parotid, submandibular, and thyroid glands are unremarkable.
LYMPH NODES: Normal. No pathological-appearing or enlarged lymph nodes.
SKULL BASE: Normal. Foramina are symmetric without bony erosion.
VASCULATURE: Normal. Limited views are unremarkable.
BONES: Normal. No significant osseous lesions.
OTHER: Normal. No additional imaging findings.

CONCLUSION: WARNING: THIS REPORT WAS APPROVED PREMATURELY AND IS NOT ACCURATE. PLEASE CONTACT US IMMEDIATELY.

PROCEDURE: CT OF THE NECK WITHOUT CONTRAST

COMPARISON: None.

INDICATIONS: None.

TECHNIQUE: CT images were created without intravenous contrast material.

FINDINGS:

NASOPHARYNX: Normal. Fossae of Rosenmuller and torus tubarius are symmetric.

ORAL CAVITY: Normal. No visible mass.

OROPHARYNX: Normal. Faucial and lingual tonsils are symmetric.

HYPOPHARYNX: Normal. No mass or other visible lesion.

LARYNX: Normal. The vocal cords are symmetric and without mass.

SINUSES: Normal. Limited views show no significant fluid or mucosal thickening.

NECK GLANDS: Normal. The parotid, submandibular, and thyroid glands are unremarkable.

LYMPH NODES: Normal. No pathological-appearing or enlarged lymph nodes.

SKULL BASE: Normal. Foramina are symmetric without bone erosion of bones.

VASCULATURE: Normal. Limited views are unremarkable.

BONES: Normal. No significant osseous lesions.

OTHER: Normal. No additional imaging findings.

CONCLUSION: WARNING: THIS REPORT WAS APPROVED PREMATURELY AND IS NOT ACCURATE. PLEASE CONTACT US IMMEDIATELY.

210 — SKULL BASE: of bones.
220 —

"Switch bones"
↑

Fig. 2B

PROCEDURE: CT OF THE NECK WITHOUT CONTRAST

COMPARISON: None.

INDICATIONS: None.

TECHNIQUE: CT images were created without intravenous contrast material.

FINDINGS:

NASOPHARYNX: Normal. Fossae of Rosenmuller and torus tubarius are symmetric.

ORAL CAVITY: Normal. No visible mass.

OROPHARYNX: Normal. Faucial and lingual tonsils are symmetric.

HYPOPHARYNX: Normal. No mass or other visible lesion.

LARYNX: Normal. The vocal cords are symmetric and without mass.

SINUSES: Normal. Limited views show no significant fluid or mucosal thickening.

NECK GLANDS: Normal. The parotid, submandibular, and thyroid glands are unremarkable.

LYMPH NODES: Normal. No pathological-appearing or enlarged lymph nodes.

SKULL BASE: Normal. Foramina are symmetric without erosion of bones.

VASCULATURE: Normal. Limited views are unremarkable.

BONES: Normal. No significant osseous lesions. — 230

OTHER: Normal. No additional imaging findings.

CONCLUSION: WARNING: THIS REPORT WAS APPROVED PREMATURELY AND IS NOT ACCURATE. PLEASE CONTACT US IMMEDIATELY.

PROCEDURE: CT OF THE NECK WITHOUT CONTRAST

COMPARISON: None.

INDICATIONS: None.

TECHNIQUE: CT images were created without intravenous contrast material.

FINDINGS:

NASOPHARYNX: Normal. Fossae of Rosenmuller and torus tubarius are symmetric.

ORAL CAVITY: Normal. No visible mass.

OROPHARYNX: Normal. Faucial and lingual tonsils are symmetric.

HYPOPHARYNX: Normal. No mass or other visible lesion.

LARYNX: Normal. The vocal cords are symmetric and without mass.

SINUSES: Normal. Limited views show no significant fluid or mucosal thickening.

NECK GLANDS: Normal. The parotid, submandibular, and thyroid glands are unremarkable.

LYMPH NODES: Normal. No pathological-appearing or enlarged lymph nodes.

SKULL BASE: Normal. Foramina are symmetric without bone erosion of bones.

VASCULATURE: Normal. Limited views are unremarkable.

BONES: Normal. No significant osseous lesions.

OTHER: Normal. No additional imaging findings.

CONCLUSION: WARNING: THIS REPORT WAS APPROVED PREMATURELY AND IS NOT ACCURATE. PLEASE CONTACT US IMMEDIATELY.

Fig. 3A

"Switch bones"

↑

PROCEDURE: CT OF THE NECK WITHOUT CONTRAST

COMPARISON: None.

INDICATIONS: None.

TECHNIQUE: CT images were created without intravenous contrast material.

FINDINGS:

NASOPHARYNX: Normal. Fossae of Rosenmuller and torus tubarius are symmetric.

ORAL CAVITY: Normal. No visible mass.

OROPHARYNX: Normal. Faucial and lingual tonsils are symmetric.

HYPOPHARYNX: Normal. No mass or other visible lesion.

LARYNX: Normal. The vocal cords are symmetric and without mass.

SINUSES: Normal. Limited views show no significant fluid or mucosal thickening.

NECK GLANDS: Normal. The parotid, submandibular, and thyroid glands are unremarkable.

LYMPH NODES: Normal. No pathological-appearing or enlarged lymph nodes.

SKULL BASE: Normal. Foramina are symmetric without erosion of bones.

VASCULATURE: Normal. Limited views are unremarkable.

BONES:

OTHER: Normal. No additional imaging findings.

CONCLUSION: WARNING: THIS REPORT WAS APPROVED PREMATURELY AND IS NOT ACCURATE. PLEASE CONTACT US IMMEDIATELY.

Fig. 3B

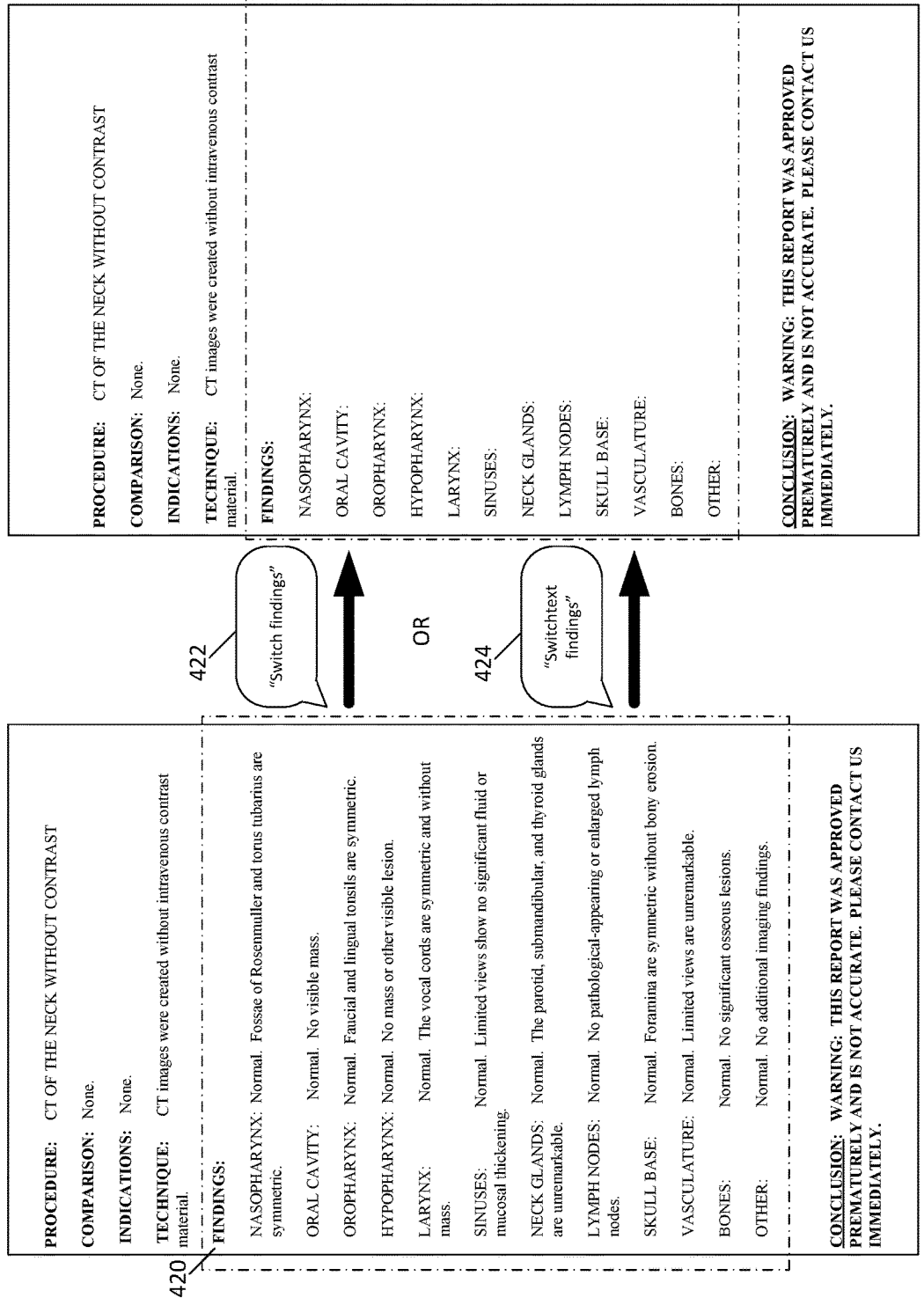

Fig. 4E

PROCEDURE: CT OF THE NECK WITHOUT CONTRAST
COMPARISON: None.
INDICATIONS: None.
TECHNIQUE: CT images were created without intravenous contrast material.
FINDINGS: All findings are normal.

NASOPHARYNX: Normal. Fossae of Rosenmuller and torus tubarius are symmetric.
ORAL CAVITY: Normal. No visible mass.
OROPHARYNX: Normal. Faucial and lingual tonsils are symmetric.
HYPOPHARYNX: Normal. No mass or other visible lesion.
LARYNX: Normal. The vocal cords are symmetric and without mass.
SINUSES: Normal. Limited views show no significant fluid or mucosal thickening.
NECK GLANDS: Normal. The parotid, submandibular, and thyroid glands are unremarkable.
LYMPH NODES: Normal. No pathological-appearing or enlarged lymph nodes.
SKULL BASE: Normal. Foramina are symmetric without bony erosion.
VASCULATURE: Normal. Limited views are unremarkable.
BONES: Normal. No significant osseous lesions.
OTHER: Normal. No additional imaging findings.

CONCLUSION: WARNING: THIS REPORT WAS APPROVED PREMATURELY AND IS NOT ACCURATE. PLEASE CONTACT US IMMEDIATELY.

430

"Switchheadingtext findings"

Fig. 4F

PROCEDURE: CT OF THE NECK WITHOUT CONTRAST
COMPARISON: None.
INDICATIONS: None.
TECHNIQUE: CT images were created without intravenous contrast material.
FINDINGS:

NASOPHARYNX: Normal. Fossae of Rosenmuller and torus tubarius are symmetric.
ORAL CAVITY: Normal. No visible mass.
OROPHARYNX: Normal. Faucial and lingual tonsils are symmetric.
HYPOPHARYNX: Normal. No mass or other visible lesion.
LARYNX: Normal. The vocal cords are symmetric and without mass.
SINUSES: Normal. Limited views show no significant fluid or mucosal thickening.
NECK GLANDS: Normal. The parotid, submandibular, and thyroid glands are unremarkable.
LYMPH NODES: Normal. No pathological-appearing or enlarged lymph nodes.
SKULL BASE: Normal. Foramina are symmetric without bony erosion.
VASCULATURE: Normal. Limited views are unremarkable.
BONES: Normal. No significant osseous lesions.
OTHER: Normal. No additional imaging findings.

CONCLUSION: WARNING: THIS REPORT WAS APPROVED PREMATURELY AND IS NOT ACCURATE. PLEASE CONTACT US IMMEDIATELY.

VOICE COMMANDS FOR REPORT EDITING

CROSS-REFERENCE TO RELATED APPLICATION

This application is a continuation of U.S. patent application Ser. No. 14/272,364, filed May 7, 2014, which application claims the benefit of priority under 35 U.S.C. § 119(e) of U.S. Provisional Application No. 61/821,856, filed May 10, 2013. The disclosures of all of the above noted applications are hereby incorporated by reference herein in their entireties.

BACKGROUND

In the field of voice dictation, dictation software running on a computer, such as a desktop computer, laptop computer, tablet computer, and/or smartphone, may convert spoken words of a user to text. Such software and various voice dictation systems may utilize speech recognition methods and/or processes to convert received audio input to textual data. Further, such voice dictation software and systems may receive commands via audio input which may be recognized and converted to actions and/or other types of inputs, for example, executing a computer application or selecting a button in a computer application.

SUMMARY

The systems, methods, and devices described herein each have several aspects, no single one of which is solely responsible for its desirable attributes. Without limiting the scope of this disclosure, several non-limiting features will now be described briefly.

A voice command system is disclosed in which, according to various embodiments, a user may select, delete, and/or modify items of textual content associated with headings and/or subheadings of a document by providing an input including a command (or identifier) and an identifier (of a heading and/or subheading of the document). The system may recognize, via voice recognition software, the command and the identifier. For example, the system may include rules for determining a particular heading or subheading of the document being referenced by the identifier. The system may also include rules for identifying the textual content related to the identified heading or subheading. Once the textual content is identified, the system may automatically select or delete the identified textual content, and/or place a cursor (for example, a text input cursor) in a location where the deleted textual content was previously located. Thus, the voice command system may enable a user to easily and quickly select and/or delete information associated with headings and/or subheadings in a document.

Further, according to an embodiment, the system may recognize an identifier from the user (e.g., provided via a voice command) including an identification of a heading and a subheading. The system may then identify the heading in the document, and then identify the subheading associated with the identified heading within the document. Next, the system may automatically modify the identified subheading of the heading, as described above. This aspect of the voice command system may enable the user to select particular subheadings of a heading in a document when, for example, other subheadings of the same name, but located under different headings, are included in the document.

Additionally, according to an embodiment, the system may recognize an input from the user including an identification of a subheading of a previously identified heading. The system may then identify the subheading of the previously identified heading in the document, and automatically modify the identified subheading, as described above. This aspect of the voice command system may enable the user to select a particular or different subheading of a previously identified heading without re-identifying the heading of the document when, for example, other subheadings of the same name, but located under different headings, are included in the document.

In various embodiments, the voice command system may be useful to, for example, physicians inputting and/or modifying information in a medical report, and/or any other users inputting and/or modifying textual information in any other type of document.

According to an embodiment, a computing system is disclosed that comprises an electronic display configured to display items of textual information, the items of textual information including one or more headings; a microphone configured to receive audio input from a user of the computing system; one or more computer processors in communication with the electronic display and the microphone and configured to execute software instructions; and one or more storage devices in communication with the one or more computer processors and storing a rule set and software instructions configured for execution by the one or more computer processors in order to cause the system to: display, on the electronic display, the items of textual information to the user; receive, from the user via the microphone, an audio input including at least a command and a heading identifier; in response to receiving the command and the heading identifier, determine, based on the rule set, a first item of textual information following a heading associated with the heading identifier; and select, based on the rule set, the first item of textual information.

According to another embodiment, a computer-implemented method is disclosed that comprises, under direction of one or more hardware processors configured with specific software instructions, receiving, from a user interacting with a textual record including one or more nodes, an input including a command and a node identifier; and in response to receiving the command: identifying, based on the node identifier, a node of the textual record associated with the node identifier; determining a portion of the textual record related to the identified node; and selecting the portion of the textual record.

According to yet another embodiment, a computer-readable storage medium storing computer-executable instructions is disclosed that, when executed by a computer system, configure the computer system to perform operations comprising: displaying, on an electronic display, a textual record including one or more nodes and one or more subnodes; receiving, from a user interacting with the textual record, an input including a command and a identifier; and in response to receiving the command: identifying, based on a set of rules and the identifier, a node or subnode of the textual record associated with the identifier; determining a portion of the textual record related to the identified node or subnode; and selecting the portion of the textual record.

According to another embodiment, a computer-implemented method is disclosed that comprises, under direction of one or more hardware processors configured with specific software instructions, displaying, on an electronic display, a textual record including one or more nodes and one or more subnodes; receiving, from a user interacting with the textual record, an input including a command, a node identifier, and a subnode identifier; and in response to receiving the command: identifying, based on the node identifier, a node of the textual record associated with the node identifier; identifying, based on the subnode identifier, a subnode of the identified node, the subnode associated with the subnode identifier; and determining a portion of the textual record related to the identified subnode.

BRIEF DESCRIPTION OF THE DRAWINGS

The following aspects of the disclosure will become more readily appreciated as the same become better understood by reference to the following detailed description, when taken in conjunction with the accompanying drawings.

FIGS. 1A and 1B illustrate examples of medical reports in different formats.

FIGS. 2A and 2B illustrate an example of a user using a voice command system to select a portion of text in a medical report via a voice command, according to an embodiment of the present disclosure.

FIGS. 3A-3B and 4A-4F illustrate multiple examples of a user using the voice command system to delete various portions of text in a medical report via voice commands, according to various embodiments of the present disclosure.

FIG. 7B illustrates example command formats for selecting subnodes with the voice command system, according to various embodiments of the present disclosure.

DETAILED DESCRIPTION

Overview

Figures 4A, 4B:
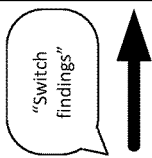

As mentioned above, the systems and methods of a voice command system discussed herein may provide, among other features, voice commands that allow a user to more efficiently and easily edit documents, such as medical reports having multiple sections and/or headings. For example, in response to a particular voice command, a software application in which a document is open may select an entire section of text in the document that is associated with the voice command, such as text following a heading. Various examples of this functionality are described below.

Using the voice command system (also referred to as "the system"), according to various embodiments, a user may select, delete, and/or modify items of textual content associated with headings and/or subheadings of a document by providing an input including a command (or identifier) and an identifier of a heading and/or subheading. The system may recognize, via voice recognition software, the command and the identifier. For example, the system may include rules for determining a particular heading/subheading of the document being referenced by the identifier. The system may also include rules for identifying the textual content related to the identified heading/subheading. Once the textual content is identified, the system may automatically select or delete the identified textual content, and/or place a cursor (for example, a text input cursor) in a location where the deleted textual content was previously located. The voice command system may enable a user to easily and quickly select and/or delete information associated with headings and/or subheadings in a document.

Further, according to an embodiment and as mentioned above, the system may recognize an input from the user including an identification of a heading and a subheading. The system may then identify the heading in the document, and then identify the subheading of the heading in the document. Next, the system may automatically modify the identified subheading of the heading, as described above. This aspect of the voice command system may enable the user to select particular subheadings of a heading in a document when, for example, other subheadings of the same name, but located under different headings, are included in the document.

Additionally, according to an embodiment, the system may recognize an input from the user including an identification of a subheading of a previously identified heading. The system may then identify the subheading of the previously identified heading in the document, and automatically modify the identified subheading, as described above. This aspect of the voice command system may enable the user to selected a particular or different subheading of a previously identified heading without re-identifying the heading of the document when, for example, other subheadings of the same name, but located under different headings, are included in the document.

In various embodiments, as mentioned above, the voice command system may be useful to, for example, physicians inputting and/or modifying information in a medical report, and/or any other users inputting and/or modifying textual information in any other type of document. While many of the examples and figures of the present disclosure describe the voice command system in the context of medicine and medical report review and editing, the systems and methods described have equal applicability to any number of other fields and, thus, references herein to such medical applications may be interpreted to cover any other field and/or applications.

In various embodiments, the system may or may not display the textual content to the user as the user interacts with the textual content. Whether or not the textual content is displayed to the user (on, for example, an electronic display) may be determined on, for example, one or more rules and/or a preferences of the user.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Node: A portion or section of an item of content. Generally a node, or nodes, in an item of content define a first level in a hierarchical organization of the item of content. A node may or may not include one or more subnodes. For example, in the context of an item of textual content, such as a document, form, report, article, and/or the like, where the textual content is organized into sections (the sections being a first level of hierarchical organization), each section may be a node. Generally, a node ends at the beginning of another node or the end of the item of content. The terms "node," and "section" may be used interchangeably in the present disclosure.

Subnode: A sub-portion or subsection of a node of an item of content. Generally a subnode, or subnodes, in an item of content define a second level in a hierarchical organization of the item of content. A subnode may include sub-subnodes (and sub-subnodes may include sub-sub-subnodes, etc.), which may define further levels of hierarchical organization of the item of content. For example, in the context of an item of textual content (as described above), where the sections of the textual content are organized into subsections (the subsections being a second level of hierarchical organization), each subsection may be a subnode. Generally, a subnode ends at the beginning of another subnode or the end of the parent node of the subnode. The terms "subnode," "subsection," and "level 2 node" may be used interchangeably in the present disclosure.

Heading: An item of information that indicates a beginning of a node. For example, in the context of an item of textual content (as described above), a node may be identified by an associated heading and/or title. In general, a heading may be used as an identifier of a particular node, and may be a string of text (e.g., one or more words) that may be read verbally by a user of the system to identify the particular node. Also, generally, content (for example, textual content) associated with a heading follows the heading (for example, such content may begin after, to the right or left of, below, and/or on a new line after the heading). The terms "heading," "header," and "title" may be used interchangeably in the present disclosure.

Subheading: An item of information that indicates a beginning of a subnode. For example, as with headings and nodes, in the context of an item of textual content (as described above), a subnode may be identified by an associated subheading. In general, a subheading may be used as an identifier of a particular subnode, and may be a string of text (e.g., one or more words) that may be read verbally by a user of the system to identify the particular subnode. Also, generally, content (for example, textual content) associated with a subheading follows the subheading (for example, such content may begin after, to the right or left of, below, and/or on a new line after the subheading). The terms "subheading" and "subheader" may be used interchangeably in the present disclosure.

Figures

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

FIGS. 1A and 1B illustrate examples of medical reports in different formats that may be used in conjunction with the voice command system. FIG. 1A illustrates an example medical report in a first format in which each of the headings (e.g., PROCEDURE, COMPARISON, INDICATIONS, TECHNIQUE, FINDINGS, CONCLUSION) and subheadings (e.g., NASOPHARYNX, ORAL CAVITY, ORO-PHARYNX, HYPOPHARYNX, etc.) are in a particular format (e.g., all caps and followed by a colon) and followed by the radiologist's comments regarding each of those items. FIG. 1B illustrates another example medical report in a second format in which the headings and subheadings are in the same format as in FIG. 1A (e.g., all caps and followed by a colon), but the radiologist's comments are on a next line of the report document. In general, the voice command system may be used with textual content in various different formats (for example, in which heading/subheadings are in different formats), for example the example medical reports of FIGS. 1A and 1B described above.

As described above, dictation software running on a computer, such as a desktop computer, laptop computer, tablet computer, and/or smartphone, may convert spoken words of a user to text and/or command. Such software and various voice dictation systems may utilize speech recognition methods and/or processes to convert received audio input to textual data, actions, recognizable commands (for example, executing a computer application or selecting a button in a computer application), and/or other types of inputs. Dictation software may allow a user to select a particular word or phrase using a command such as "select oral cavity" in order to cause the software application to select the text "oral cavity". Similarly, if a user wishes to select text associated with a particular heading, the speech recognition typically requires the user to speak a command such as "select CT images were created without intravenous contrast material" in order to have the software application select the text associated with the TECHNIQUE heading (see FIGS. 1A and 1B).

As described herein, the voice command system may include existing dictation software and/or a customized proprietary dictation software that may be re-programmed and/or modified to recognize commands that allow easier selection and/or modification of text associated with one or more headings (and/or subheadings) by a user. In another embodiment, the voice command system may be a stand-alone piece of software that includes voice recognition capabilities and the functionality described herein. FIGS. 2A-2B, 3A-3B, and 4A-4F illustrate examples of a user using the voice command system to select and/or modify portions of text associated with headings/subheading in a medical report via a voice command, according to various embodiments of the present disclosure.

Examples of Selecting/Deleting Content

Turning to FIG. 2A, an example medical report with sample radiologist comments is displayed. In this example medical report, the term "bones" is included at two locations: location 210 as part of the radiologist findings with reference to the SKULL BASE subheading, and at location 220 as a subheading itself. In an embodiment, the voice command system (for example, the modified dictation software) recognizes a command that determines whether or not an identifier associated with the command is a heading/subheading (e.g. "bones" at 220 is a subheading, while "bones" at 210 is not a heading or subheading) and allows selection of text associated with the heading/subheading without requiring the user to speak the entire associated text. For example, FIG. 2B illustrates the sample report of FIG. 2A after a user has provided a "switch" command, where the "switch" command is discussed herein as an illustrative command terminology associated with functionality discussed herein. In other embodiments, the term "switch" may be replaced with any other term. For ease of discussion, however, the term "switch" is used herein. The switch command may be configured in this embodiment to identify a heading or subheading associated with one or more identifiers spoken after the command (e.g., the command syntax may be "<command> <identifier(s)>") and to select the text associated with the heading/subheading (rather than the heading/subheading itself). As shown in FIG. 2B, after the user provides the command "switch bones" (where "switch" is the command and "bones" is the identifier), the system may identify the BONES subheading at location 220 (and ignore the term "bones" at location 210), and then select the text 230 associated with the BONES subheading. With the text 230 selected, the user may then provide replacement text via voice recognition, keyboard, and/or other input device. As used herein, "command" may refer to a word or words that indicates an action to be performed (e.g., "switch") upon an identifier that follows the command (e.g., "bones"), or a "command" may refer to a combination of a word or words that indicates and action to be performed and the associated identifier (e.g., the command "switch bones"). In various embodiments discussed herein, identifiers may be associated with various document components and referred to as particular types of identifiers, such as "heading identifier," "subheading identifier," "node identifier," "subnode identifier," and/or the like.

FIG. 3A illustrates the same sample report as FIG. 2A, but in this embodiment the system is configured such that the switch command not only causes selection of text associated with a provided heading/subheading, but to also delete that selected text. For example, as shown in FIG. 3B, after the user provides the "switch bones" command, the system may locate the BONES subheading and remove or delete the text associated with the BONES subheading. In one embodiment, the system, after removing the selected text, may place the cursor in the previous location of the selected text such that the user may then provide replacement text at that location (as described above). In an embodiment, deleted text may be copied and/or placed in a clipboard of the system and/or another operating system in which the voice command system executes.

In an embodiment, the system is configured to determine a heading level in order to determine a particular item of text to select (and/or delete). For example, in the embodiment of FIG. 4A, the headings PROCEDURE, COMPARISON, INDICATIONS, TECHNIQUE, FINDINGS, and CONCLUSION, may be considered section headings, while the subheadings NASOPHARYNX, ORAL CAVITY, OROPHARYNX, etc., below the FINDINGS heading may each be considered subheadings to the FINDINGS heading. When the user provides the command "SWITCH FINDINGS", the system may locate the FINDINGS heading at location 410. The system may then determine that the FINDINGS heading is associated with multiple subheadings (e.g., NASOPHARYNX, ORAL CAVITY, OROPHARYNX, etc.). Accordingly, in response to the "switch findings" command, the system may select and/or delete any text from the FINDINGS heading to a next heading or the end of the document (for example, including all of the subheadings below the indicated FINDINGS heading). As shown in FIG. 4B, each of the subheadings following the FINDINGS heading (or contained within the FINDINGS node) have been deleted in response to the "switch findings" command. Depending on the embodiment, the "switch" command may be configured to cause the system to select and/or delete all text and/or subheadings associated with an indicated heading.

In various embodiments, a voice command for selecting/deleting subheadings of an indicated heading may be different than the voice command for selecting/deleting only text associated with the heading and subheadings. For example, as shown in FIG. 4C, a FINDINGS heading 420 includes various subheadings with associated text (as with FIG. 4A). In the embodiment of FIG. 4C, in response to a command 422 identifying the FINDINGS heading (for example, "switch findings"), the system may delete only text associated with each of the subheadings of the selected heading, as shown in FIG. 4D, rather than the subheadings and the text associated with the subheadings (as in FIGS. 4A-4B). Such a configuration may be desirable when, for example, a physician plans to re-enter and/or edit information associated with each (or some) of the subheadings. Additionally, in an embodiment the system may include a different command, for example "switchtext" shown at 424, that may cause selection/deletion of only textual content associated with the subheadings of the indicated heading, rather than all content from the indicated heading to a next heading (as in FIGS. 4A-4B).

In various embodiments, the system may be configured with a voice command for selecting/deleting only text associated with a heading (or subheading). For example, as shown in FIG. 4E, a FINDINGS heading 420 includes associated text (e.g., "All finding are normal.") in addition to the various subheadings (as with FIG. 4A). In the embodiment of FIG. 4E, the system may include a command, for example "switchheadingtext," that may cause selection/deletion of only textual content associated with the identified heading, as shown in FIG. 4F, rather than all content from the indicated heading to a next heading (as in FIGS. 4A-4B).

In various embodiments the system may further be configured to automatically replace an item of selected text with a different item of text (for example, from a system clipboard).

Example Methods Performed by the System

Figure 5:
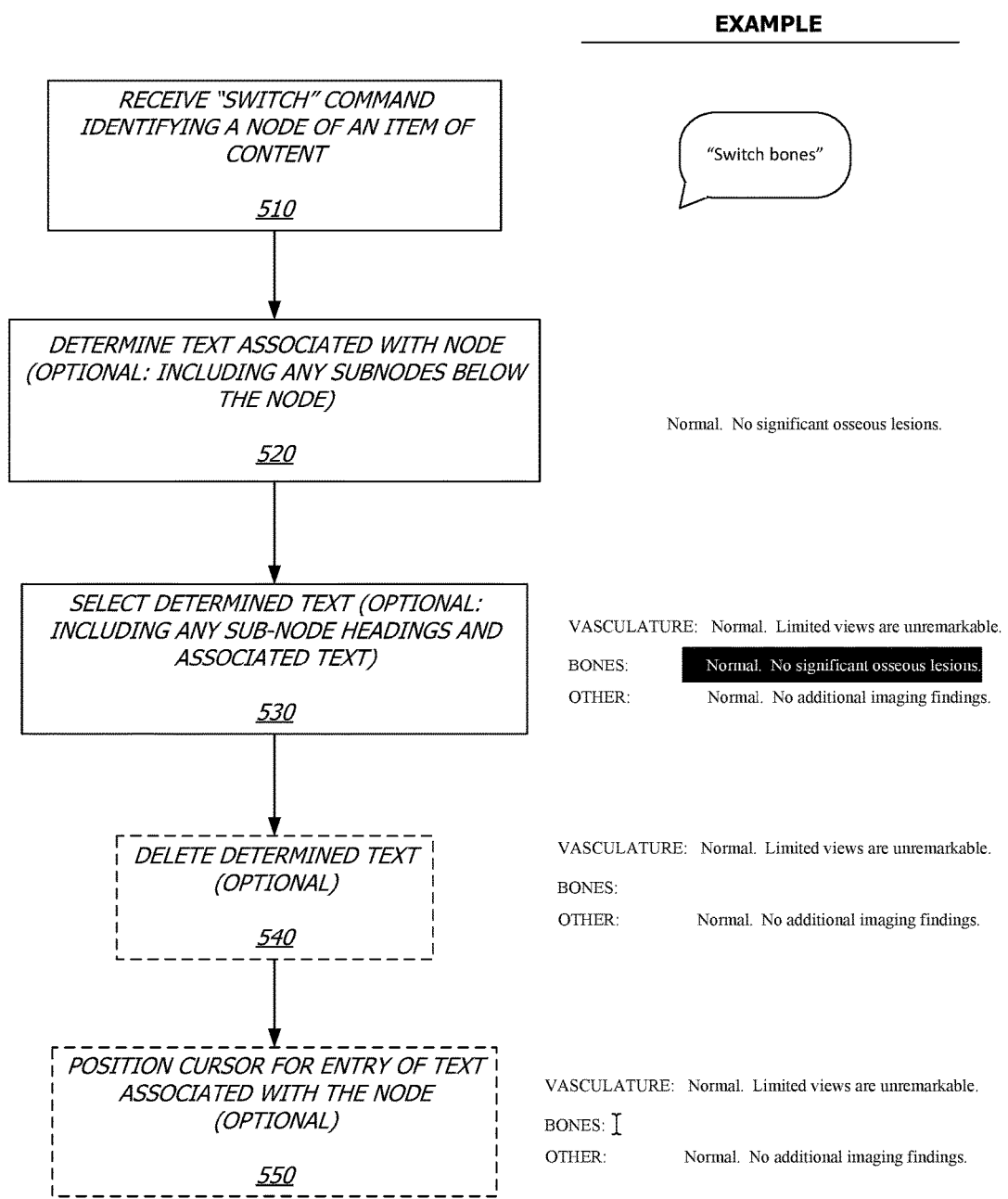
FIG. 5 is a flowchart illustrating an example method of the voice command system, according to an embodiment of the present disclosure.

FIG. 5 is a flowchart illustrating an embodiment of a method of selecting and/or deleting text of a medical report (and/or any other document having multiple headings, sections, and/or other nodes). In an embodiment, the method of FIG. 5 may be performed by a computing device on which a medical report is read by a radiologist, physician, or other individual. In an embodiment, the method of FIG. 5 may be performed by a computing device such as computing device 150 (described in reference to FIG. 9 below). FIG. 5 also illustrates an example of each block to the right of the flowchart blocks. These examples are illustrative only and do not limit the scope of the method to the particular example shown. Depending on the embodiment, the method may include fewer or additional blocks and/or the blocks may be performed in an order that is different than illustrated.

Beginning at block 510, the system may receive a "switch" command that includes one or more identifiers associated with a node (for example, a heading) of an item of content (for example, a report and/or other document). As described above, the "switch" command is illustrative. "Switch" may be replaced with any other terminology in various embodiments. In an embodiment, a combination of an existing command, such as "select", and another input (for example, a key press and/or other input) may perform the functionality described herein with reference to the "switch" command. For example, in an embodiment the user may indicate a "switch" command by holding down a CTRL key on a keyboard while the user speaks "select".

In the example of FIG. 5, nodes and subnodes are discussed in order to illustrate the functionality discussed elsewhere with reference to headings and subheadings, which may be more broadly applied to any document that has some organizational and/or hierarchical structure, such as an outline, an XML document, and/or the like. For example, as described above, a node or subnode may be any content identified, typically with the subnode being below a node in a hierarchical organization. Additional hierarchical levels may also be used, such as one or more sub-subnodes that may exist below a subnode.

In the example provided in FIG. 5, at block 510 the user has enunciated "switch bones" where switch is the command and "bones" is the identifier associated with a node or subnode. In various embodiments, a node (or heading) associated with the identifier (or indicated heading/node/subheading/subnode) may be determined based on one or more heading (or node/subheading/subnode) identification rules. The heading (or node/subheading/subnode) identification rules may be included in one or more rule sets, stored in a rules database, and executed by a rules engine, as described below.

Moving to block 520, the system may determine text associated with the indicated node. For example, when the indicated node is a subheading, the radiologist description associated with that subheading may be identified at block 520. However, when the indicated node is a heading, e.g., having one or more associated subheadings, the text of the subheading (if any) as well as the radiologists descriptions associated with those subheadings may all be identified at block 520. In an embodiment, when the identifier identifies a node having one or more subnodes, the subnode identifiers are not identified at block 520 (as described above with respect to FIGS. 4C-4D). For example, in the example of the medical report of FIG. 4A, the identified node is FINDINGS, the text associated with the subnodes may be identified at block 520, but not the actual subnode identifiers, such as "NASOPHARYNX:", "ORAL CAVITY:", "HYPOPHARYNX:", etc. In this embodiment, the subnode identifiers may be maintained in the document so that the user can more easily provide replacement descriptions for those subnodes.

In various embodiments, the determination of text associated with the indicated node may be determined based on one or more selection (or text selection) rules. The selection rules may be included in one or more rule sets, stored in a rules database, and executed by a rules engine, as described below.

Next, at block 530 the text identified at block 520 may be selected. Further, at optional block 540 the selected text may be deleted. As described above, in various embodiments the identified text is selected and not deleted, while in others the selected text is deleted. Accordingly, in some embodiments block 540 would not be performed. In some embodiments other actions may be taken with respect to the selected text. For example, the selected text may be replaced with other textual information. In various embodiments, an action taken with respect to the selected text (for example, deletion) may be determined based on one or more selected text action rules. The selected text action rules may be included in one or more rule sets, stored in a rules database, and executed by a rules engine, as described below.

At optional block 550, the cursor may be positioned for entry of text associated with the identified node (for example, at the location where the determined text was selected and/or deleted).

In some embodiments, the medical report (or other textual information) may or may not be displayed to a user. For example, the user may interface with the system by providing commands to select, replace, and/or delete nodes, subnodes, and/or other textual information without viewing the textual information. Such an example may be useful to, for example, a physician who is very familiar with a particular type of medical report, and who may be able, through experience, to interact with the medical form without viewing the medical form (or only viewing the medical form after the form is completed). Accordingly, various embodiments described above may enable a user to interact with textual information without the textual information being displayed to the user (for example, on an electronic display). In some embodiments, the user may select whether or not they want to view the textual information, and/or system may determine whether or not to display the textual information based on one or more user preferences or rules (for example, rules based on a type of the textual information, a type of the user, a location at which the user interacts with the textual information, and/or the like).

Example Rule Sets

Figure 6:
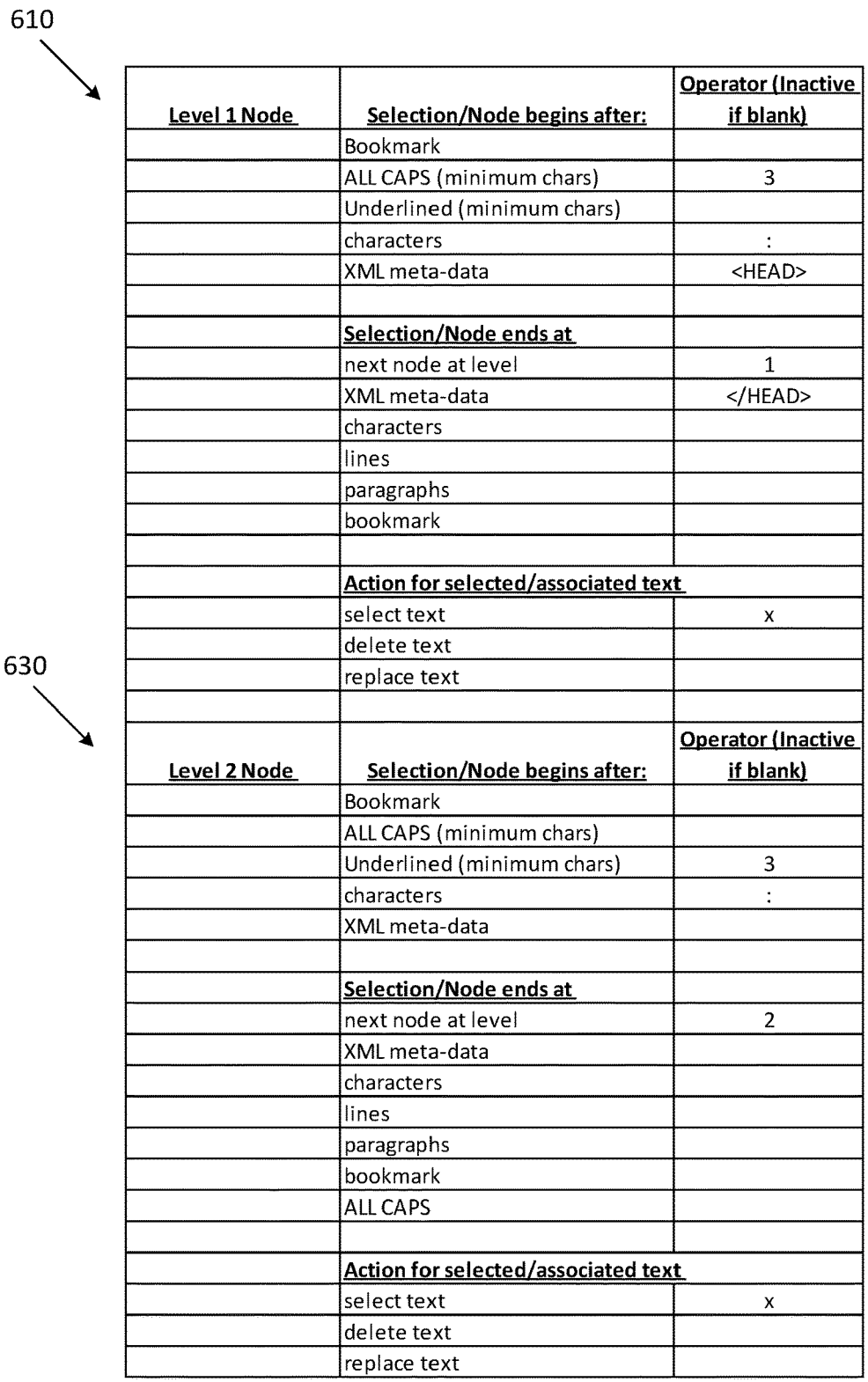
FIG. 6 illustrates an example rule set of the voice command system, according to an embodiment of the present disclosure.

FIG. 6 illustrates a sample rule set of the voice command system, according to an embodiment. The rule set of FIG. 6 may be customized by, for example, a software provider and/or a system user. The rule set may be customized on a per-user and/or per-user group basis. In an embodiment, the rule set defines nodes and how text associated with nodes may be treated in response to receiving the "switch" (or other) command. In various embodiments, the rules/rule set may be provided in any other format and may include fewer or additional customizations. Rules may be stored in any suitable data store. For example, rules and/or the rule set may be stored in a Rules Database (as described below in reference to FIG. 9). Further, as described below the rule set may be executed by a rules engine of the system, and/or the system may include multiple rule sets.

As shown in the example of FIG. 6, the rule set may include rules 610 associated with Level 1 Nodes and rules 630 associated with Level 2 Nodes (for example, subnodes). Depending on the embodiment, the nodes may be associated with different document properties or sections. For example, with reference to the medical report of FIGS. 2A and 2B, level 1 nodes may include PROCEDURE, COMPARISON, INDICATIONS, TECHNIQUE, and FINDINGS, while level 2 nodes may include NASOPHARYNX, ORAL CAVITY, OROPHARYNX, HYPOPHARYNX, LARYNX, SINUSES, NECK GLANDS, LYMPH NODES, SCHOOL BASE, VASCULATURE, BONES, and OTHER. Additionally, other node levels may be included on such a medical report. In other document types, the node levels may be associated with other types of data in other configurations. For example, an XML schema may include several nodes indicating hierarchy of various data items.

In the example of FIG. 6, the rules 610 may include three general rules (shown in the middle column), namely, "selection/node begins after," "selection/node ends at," and "action for selected/associated text." The "selection/node begins after" and "selection/node ends at" rules of the rules 610 may define how text associated with nodes is identified in a particular document (these types of rules may be referred to as selection rules or text selection rules). The example level 1 node rules 610 indicate that text associated with a level 1 node begins after text including a minimum of 3 capitalized characters followed by a colon (e.g., "TECHNIQUE:", but not "CT:"). The rules 610 further indicate that the text associated with the node continues until the next node at level 1. Accordingly, if there are multiple level 2 nodes after the 3 capitalized characters followed by a colon before a next level 1 node, the lower-level nodes (e.g., subheadings in the medical reports of FIGS. 3A and 3B) are part of the selection area. The rules 610 further indicate that level 1 node text may begin after the XML metadata "<HEAD>" and end at the XML metadata "</HEAD>".

The "action for selected/associated text" rules of the rules 610 may indicate actions to be taken with respect to the selected text (these types of rules may be referred to as selected text action rules). For example, the rules 610 indicate that that the selected text is to be selected, but not deleted. In an embodiment, the rules 610 may indicate that the selected text is to be replaced with other textual information, and/or any other action with respect to the selected text may be taken.

As shown in the table of FIG. 6, according to various embodiments, various other criteria may be used to determine which text may be selected in response to a "switch" command. For example, a length of selected text may be set to a particular number of characters, lines, or paragraphs. Accordingly, a user (and/or software provider) may determine that node text is best identified by continuing from after a node identifier until the end of the paragraph of text. Furthermore, bookmarks may be used to identify the beginning and/or end of text associated with a node. Thus, a form designer (e.g. a designer of a template medical report that is to be completed by radiologists) may embed bookmarks after each node identifier and before subsequent node identifiers so that text in between the node identifiers may be selected in response to a "switch" command. The rules of FIG. 6 also allow a user (and/or software provider) to define whether selected text/text associated with the node is to be automatically selected, deleted, or replaced.

The level 2 node rules 630 may have properties similar to, but may include values different from, those of the level 1 node rules 610. In the example of FIG. 6, the format of a node identifier for a level 2 node may differ from the format of a node identifier for a level 1 node (or other level node). Furthermore, actions taken with text associated with a selected level 2 node may differ from actions taken with reference to selected text at other node levels. Additionally, in various embodiments additional rules may be defined in relation to further levels of nodes.

In various embodiment, as described above, the rule set may further include heading (or node/subheading/subnode) identification rules that may be used to determine a heading (or node/subheading/subnode) associated with an identifier provided by the user.

Additional Examples of Selecting/Deleting Content

Figure 7A:
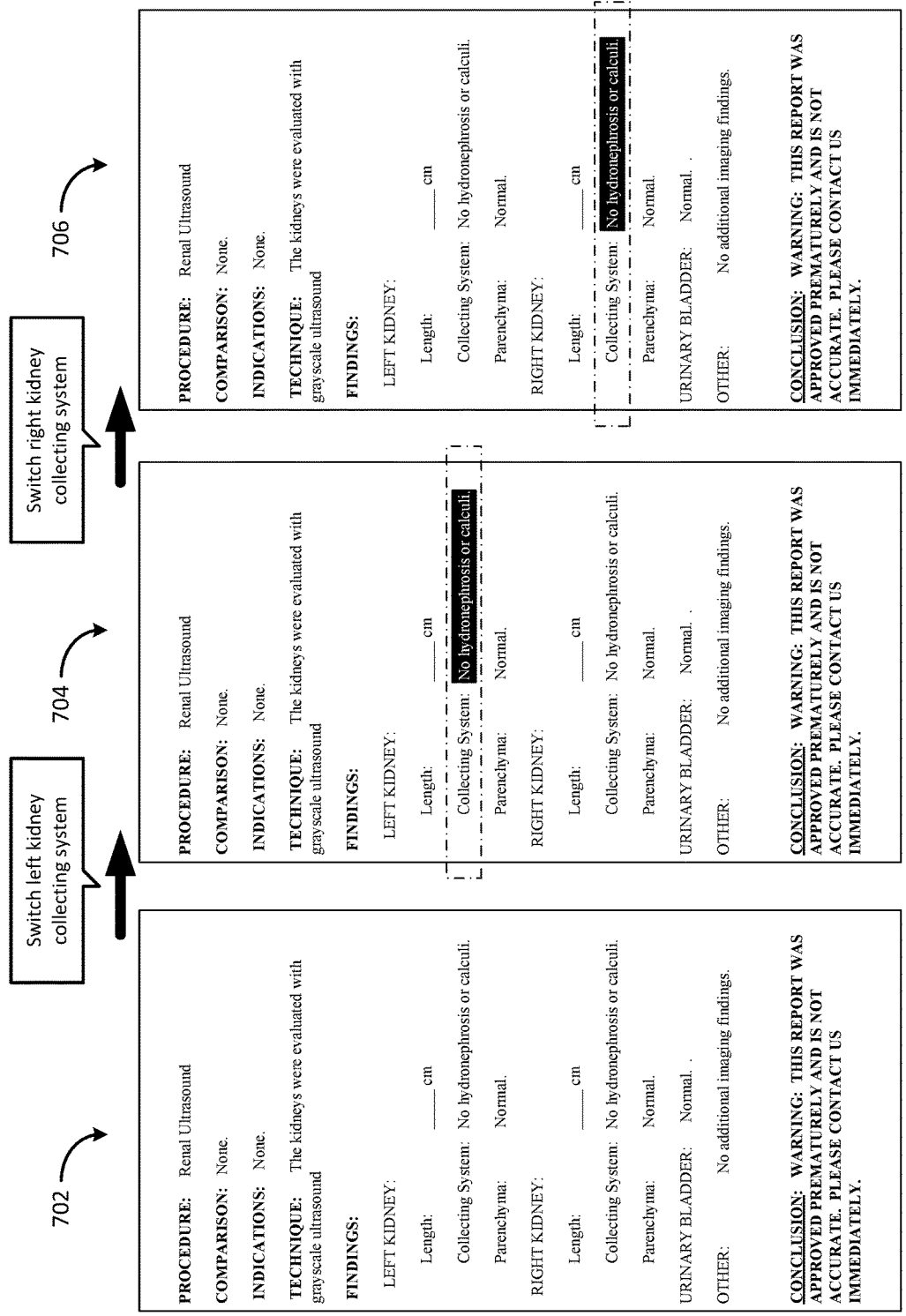
FIG. 7A illustrates an example of a user using the voice command system to select portions of text associated with subnodes in a medical report via a voice command, according to an embodiment of the present disclosure.

FIG. 7A illustrates an example of a user using the voice command system to select portions of text associated with specific subnodes of nodes in a medical report via a voice command, according to an embodiment of the present disclosure. The example medical report 702 of FIG. 7 includes findings related to both a left kidney and a right kidney, where the findings associated with each of the left and right kidney have similar names (for example, "Length," "Collecting System," and "Parenchyma"). In the example medical report 702, there are three levels of nodes. The first level includes "PROCEDURE", "COMPARISON," etc. The second level (under FINDINGS) includes "Left Kidney" and "Right Kidney." The third level (under either Left or Right Kidney) includes "Length," "Collecting System," and "Parenchyma." As described above, a user may select text associated with any of the nodes, subnodes, and/or sub-subnodes by providing a command (e.g., "switch") and an identifier (e.g., "Left Kidney"). However, in many cases multiple nodes, subnodes, and/or sub-subnodes may have the same name/identifier (e.g., the name is not unique). For example, in example medical report 702, the identifier "Length" applies to both Left and Right Kidney. In the context of medical reports on patients, other such examples may include: a "collecting system" of each kidney; a "hilum" of each lung; an "origin" of the left carotid artery, right carotid artery, and left vertebral artery; an "origin" of different coronary arteries, etc. Accordingly, in an embodiment additional information may be provided by the user to the system to enable the system to differentiate among common and/or similar identifiers in nodes, subnodes, sub-subnodes, etc. of a document.

According to the example embodiment of FIG. 7A, a user may provide a command and two or more identifiers that identify relevant hierarchical nodes (e.g., a node and a subnode) of interest to the user. For example, the user may speak "switch left kidney collecting system" which may correlate to "<command> <identifier_firstlevel> <identifier_secondlevel>" or in this example, "<command> <subnode> <sub-subnode>". Accordingly, as shown in example report 704, the system may select the text associated with the identified sub-subnode. Selection, deletion, and/or modification of selected text may occur as described above (for example, according to a rule set). As another example, the user may speak "switch right kidney collecting system", as shown in FIG. 7A, and the system may select the relevant text as shown in example report 706.

In an embodiment, when a node contains subnodes (or a subnode contains sub-subnodes), in response to receiving a command identifying a node (or subnode), but not an associated subnode (or sub-subnode), the system may automatically select/determine a subnode (or sub-subnode) to select. For example, in the example of FIG. 7A, in response to a command "switch left kidney" the system may automatically select the text associated with a default sub-subnode of the subnode "left kidney", for example, the "Length" sub-subnode. In an embodiment, the system may select a first listed subnode (or sub-subnode) of an identified node (or subnode). In another embodiment, the system may select a particular subnode (or sub-subnode) of an identified node (or subnode) based on a rule or other criteria, for example, a most frequently identified subnode (or sub-subnode), among others.

In an embodiment the system may receive commands and identifiers from the user in different formats. For example, the user may speak "SWITCH collecting system OF left kidney" or "SWITCH origin OF left vertebral artery". Examples of various formats for command/identifiers are shown in FIG. 7B. The example identifiers in commands 710 and 712 are similar to those described above. The example identifiers of command 714 are more generalized in format. In this example the nodeLevel1_Name and nodeLevel2_Name may correspond to a node and subnode, respectively. Alternatively, the nodeLevel1_Name and nodeLevel2_Name may correspond to a subnode and sub-subnode, respectively. Additionally, the combinations of command and identifiers may be generalized to arbitrary levels of nodes, as shown in the example identifiers of command 716.

Figure 8:
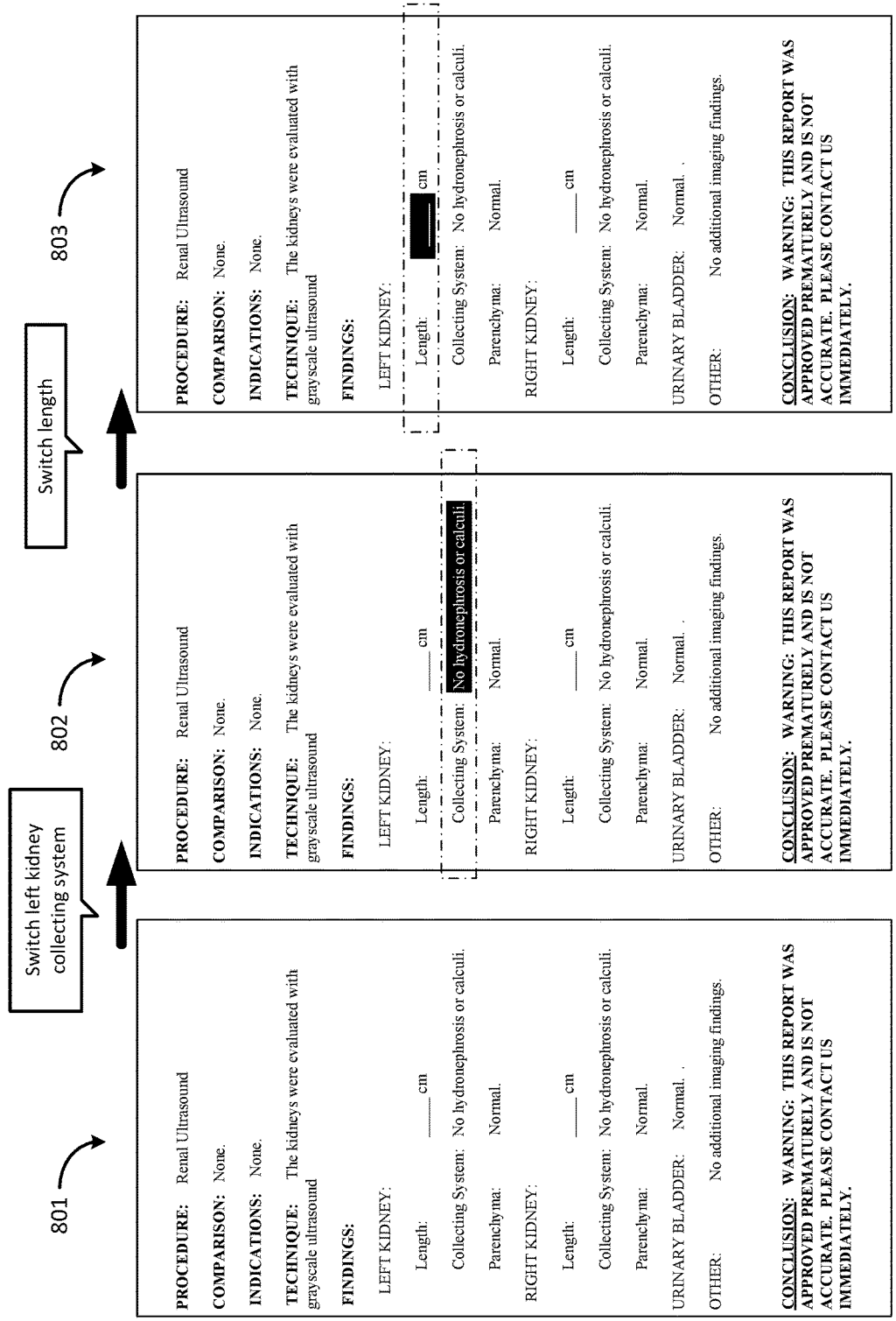
FIG. 8 illustrates another example of a user using the voice command system to select portions of text associated with subnodes in a medical report via a voice command, according to an embodiment of the present disclosure.

FIG. 8 illustrates another example of a user using the voice command system to select portions of text associated with specific subnodes of nodes in a medical report via a voice command, according to an embodiment of the present disclosure. The example medical reports 801, 802, and 803 are similar to the example medical reports of FIG. 7. In the example of FIG. 8 the user may first specify, while example report 801 is displayed, a particular item as described above in reference to FIG. 7 (for example, "switch left kidney collecting system"), which causes the FINDINGS/LEFT KIDNEY/Collecting System sub-subnode (or level 3 node)

to be selected, as shown in report 802. Then, when the user desires to select a different sub-subnode within the Left Kidney subnode, the user may simply specify the sub-subnode of interest by speaking, for example, "switch length" (see example report 803; alternatively the system may use a different command for the functionality presently described). In this example, even though the report contains two sub-subnodes with the identifier "Length," when the user previously specified a particular one of the two relevant subnodes (e.g., Left Kidney) the system may automatically determine that the subnode desired is the one that was previously specified. Accordingly, in an embodiment, when a user provides a command and identifier to the system, the system may first determine whether any subnodes/sub-subnodes of the current (for example, previously specified or currently edited) node/subnode matches the specified identifier. If so, the system may select that matched subnode/sub-subnode. If not, the system may then determine whether any subnodes/sub-subnodes of any other node/subnode matches the specified identifier. If so, the system may select that matched subnode/sub-subnode of a different node/subnode. Alternatively, the system may determine whether any other node, subnode, or sub-subnode in the document matches the identifier.

According to various embodiments, the voice command system may enable a user to easily and quickly select and/or delete information associated with headings and/or subheadings in a document. Further, the voice command system may enable the user to select particular subheadings of a heading in a document when, for example, other subheadings of the same name, but located under different headings, are included in the document. Additionally, the voice command system may enable the user to selected a particular or different subheading of a previously identified heading without re-identifying the heading of the document when, for example, other subheadings of the same name, but located under different headings, are included in the document. The voice command system may be useful to, for example, physicians inputting and/or modifying information in a medical report, and/or any other users inputting and/or modifying textual information in any other type of document.

Example Computing Systems

Figure 9:
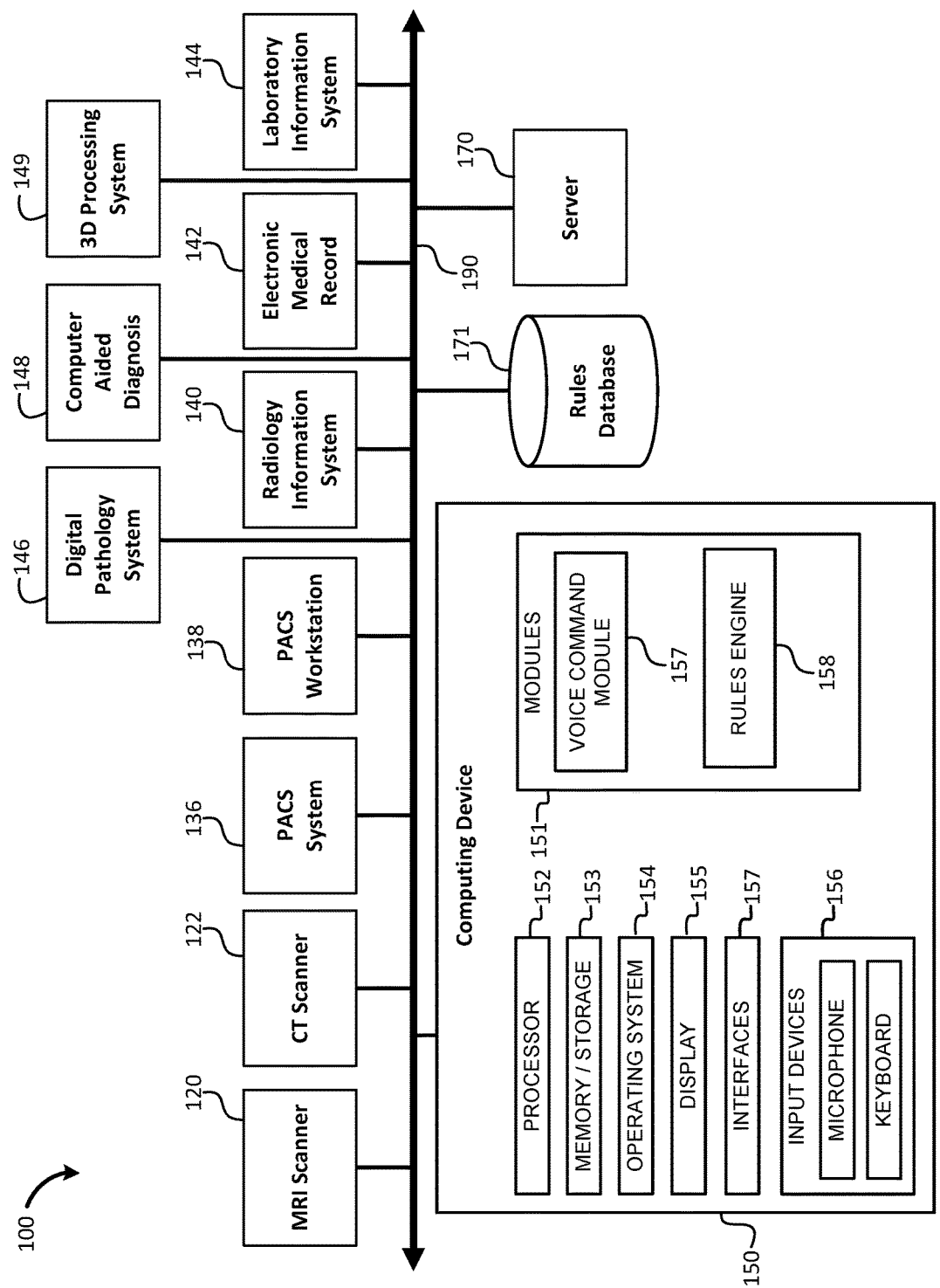
FIG. 9 is a block diagram showing various components of the voice command system, according to various embodiments of the present disclosure.

FIG. 9 is a block diagram which shows various components of the voice command system, according to various embodiments of the present disclosure. FIG. 9 shows a system 100 (for example, the voice command system) that may be used to accomplish the various systems and methods described herein. As shown, the system 100 may include a computing device 150 and may include various other optional, specialized computerized systems. For example, the system 100 may include the following optional components: a server 170, a rules database 171, an MRI Scanner 120, a CT Scanner 122, a Picture Archiving and Communication System (PACS System) 136, a PACS Workstation 138, a Digital Pathology System 146, a Radiology Information System 140, a Computer Aided Diagnosis device or system 148, an Electronic Medical Record (EMR) device or system 142, a 3D Processing System 149, and a Laboratory Information System 144. Each of the components of the system 100 may be in communication via a computer network 190 (which is described in further detail below).

The computing device 150 may take various forms. In one embodiment, the computing device 150 may be a computer workstation having modules 151, such as software modules that provide the functionality described above with reference to the various figures. Modules 151 of the computing device 150 may include a voice command module 157 and/or a rules engine 158. The voice command module 157 may for example, receive and/or process voice commands and identifiers received by the system from the user. The voice command module 157 may include various speech recognition capabilities to translate spoken language or oral speech into textual data and/or actions, as described above. The rules engine 158 may operate in conjunction with the voice command module 157 to perform the various aspects of the voice command system described above. For example, the rules engine 158 may receive the translated language and may determine, based on the rule set(s) (received and/or accessed from, for example, the rules database 171) whether particular spoken words are commands and/or identifiers. Identification of commands (possibly including one or more identifiers), as described above, as well as the selection criteria and actions to take may be defined by the rule set(s). Further the rules engine 158 may compare the received spoken input to the document or report (or other item of content) with which the user is interacting to determine particular nodes/subnodes/sub-subnodes and text associated with those particular nodes/subnodes/sub-subnodes.

In another embodiment the modules 151 of the computing device 150 may further include, for example, a command interpretation module (that may determine what command is provided and any associated identifiers and/or other operands), and/or a "switch" command module (that implements the "switch" command, such as in accordance with a rule set, such as provided in FIG. 6), among other modules. In other embodiments, one or more of the modules 151 may reside on another computing device, such as the server 170, such that processing that is performed by the modules 151 may be performed by the computing device 150, the server 170, and/or another computing device, and/or any combination of computing devices, depending on the embodiment.

Additionally, as described below, the software modules 151 may include various software instructions, code, logic instructions, and/or the like that may be executed by one or more processors 152 to accomplish the functionality described above.

Rules and/or rule sets may be stored in the rules database 171, and may be accessible by the computing device 150 via, for example, the computer network 190. In various embodiments the rules database 171 may be a file, table, data store, and/or other electronic structure capable of holding rules and/or rule sets as described above in reference to FIGS. 5-6. The rules database 171 may include various rules and/or rule sets (for example, heading identification rules, selection rules, and/or selected text action rules) that be used by the system to determine nodes or headings associated with an identifier, text associated with an identified node, and/or actions to be taken with respect to selected text (as all described above). In an embodiment, the rules and/or rule sets may be stored locally in a data store of the computing device 150.

In one embodiment, the computing device 150 comprises a server, a desktop computer, a workstation, a Picture Archiving and Communication System (PACS) workstation, a laptop computer, a mobile computer, a smartphone, a tablet computer, a cell phone, a personal digital assistant, a gaming system, a kiosk, an audio player, any other device that utilizes a graphical user interface, including office equipment, automobiles, airplane cockpits, household appliances, automated teller machines, self-service checkouts at stores, information and other kiosks, ticketing kiosks, vending machines, industrial equipment, and/or a television, for example.

The computing device 150 may run an off-the-shelf operating system 154 such as a Windows, Linux, MacOS, Android, or iOS, or mobile versions of such operating systems. The computing device 150 may also run a more specialized operating system which may be designed for the specific tasks performed by the computing device 150, or any other available operating system.

The computing device 150 may include one or more computing processors 152. The processors 152 may include central processing units (CPUs), and may further include dedicated processors such as graphics processor chips, or other specialized processors. The processors generally are used to execute computer instructions based on the information display software modules 151 to cause the computing device to perform operations as specified by the modules 151. The modules 151 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. For example, modules may include software code written in a programming language, such as, for example, Java, JavaScript, ActionScript, Visual Basic, HTML, Lua, C, C++, or C#. While "modules" are generally discussed herein with reference to software, any modules may alternatively be represented in hardware or firmware. Generally, the modules described herein refer to logical modules that may be combined with other modules or divided into sub-modules despite their physical organization or storage.

The computing device 150 may also include memory 153. The memory 153 may include volatile data storage such as RAM or SDRAM. The memory 153 may also include more permanent forms of storage such as a hard disk drive, a flash disk, flash memory, a solid state drive, or some other type of non-volatile storage.

The computing device 150 may also include or be interfaced to one or more display devices 155 that provide information to the users. Display devices 155 may include a video display, such as one or more high-resolution computer monitors, or a display device integrated into or attached to a laptop computer, handheld computer, smartphone, computer tablet device, or medical scanner. In other embodiments, the display device 155 may include an LCD, OLED, or other thin screen display surface, a monitor, television, projector, a display integrated into wearable glasses, or any other device that visually depicts user interfaces and data to viewers. As described above, reports and/or other textual information may be displayed to the user via the display device 155 such that the user may then determine particular items of information to select and/or delete.

The computing device 150 may also include or be interfaced to one or more input devices 156 which receive input from users, such as a keyboard, trackball, mouse, 3D mouse, drawing tablet, joystick, game controller, touch screen (for example, capacitive or resistive touch screen), touchpad, accelerometer, video camera and/or microphone. In an embodiment, a user of the computing device 150 may provide verbal inputs and/or commands to the computing device 150 via the microphone. For example, the computing device 150 may receive such audio inputs which may be determined by, for example, the modules 151 in conjunction with the processor 152 to include verbal commands. The processor 152 may then execute the one or more software modules 151 (for example the rules engine 158), as described above, to select and/or delete particular items of information (such as textual information included in a node and/or subnode of a report or other textual information as displayed on the display device 155). Additionally, as described above, in various embodiments the user may provide commands to the system via the keyboard and/or a combination of the keyboard and spoken words.

The computing device 150 may also include one or more interfaces 157 which allow information exchange between computing device 150 and other computers and input/output devices using systems such as Ethernet, Wi-Fi, Bluetooth, as well as other wired and wireless data communications techniques.

The modules of the computing device 150 may be connected using a standard based bus system. In different embodiments, the standard based bus system could be Peripheral Component Interconnect ("PCI"), PCI Express, Accelerated Graphics Port ("AGP"), Micro channel, Small Computer System Interface ("SCSI"), Industrial Standard Architecture ("ISA") and Extended ISA ("EISA") architectures, for example. In addition, the functionality provided for in the components and modules of computing device 150 may be combined into fewer components and modules or further separated into additional components and modules.

The computing device 150 may communicate and/or interface with other systems and/or devices. In one or more embodiments, the computing device 150 may be connected to the computer network 190. The computer network 190 may take various forms. It may include a wired network or a wireless network, or it may be some combination of both. The computer network 190 may be a single computer network, or it may be a combination or collection of different networks and network protocols. For example, the computer network 190 may include one or more local area networks (LAN), wide area networks (WAN), personal area networks (PAN), cellular or data networks, and/or the Internet.

The computing device 150 may be configured to interface with various networked computing devices via the network 190 in order to provide efficient and useful review of data. The server 170 may include any computing device, such as image acquisition and/or storage devices from which the computing device 150 accesses image data that is usable to generate 3D images for display in the manner described above.

Depending on the embodiment, the other devices illustrated in FIG. 9 may include some or all of the same components discussed above with reference to the computing device 150.

Additional Embodiments

Any process descriptions, elements, or blocks in the flow diagrams described herein and/or depicted in the attached figures should be understood as potentially representing modules, segments, or portions of code which include one or more executable instructions (as described below) for implementing specific logical functions or steps in the process. Alternate implementations are included within the scope of the embodiments described herein in which elements or functions may be deleted, executed out of order from that shown or discussed, including substantially concurrently (for example, through multi-threaded processing, interrupt processing, or multiple processors or processor cores or on other parallel architectures) or in reverse order, depending on the functionality involved.

Any of the methods and processes described above may be partially or fully embodied in, and partially or fully automated via, logic instructions, software code instructions, and/or software code modules executed by one or more general purpose processors and/or application-specific processors (also referred to as "computer devices," "computing devices," "hardware computing devices," "hardware processors," and the like). For example, the methods described herein may be performed as software instructions are executed by, and/or in response to software instruction being executed by, one or more hardware processors and/or any other suitable computing devices. The software instructions and/or other executable code may be read from a tangible computer-readable medium. A tangible computer-readable medium is a data storage device that can store data that is readable by a computer system and/or computing devices. Examples of computer-readable mediums include read-only memory (ROM), random-access memory (RAM), other volatile or non-volatile memory devices, DVD-ROMs, CD-ROMs, magnetic tape, flash drives, and/or optical data storage devices. Accordingly, a software module may reside in RAM memory, flash memory, ROM memory, EPROM memory, EEPROM memory, registers, hard disk, solid state drive, a removable disk, a CD-ROM, a DVD-ROM, and/or any other form of a tangible computer-readable storage medium.

Additionally, any of the methods and processes described above may be partially or fully embodied in, and partially or fully automated via, electronic hardware (for example, logic circuits, hardware processors, and/or the like). For example, the various illustrative logical blocks, methods, routines, and the like described in connection with the embodiments disclosed herein may be implemented as electronic hardware, computer software, or combinations of both. To clearly illustrate this, various illustrative components, blocks, modules, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

Many variations and modifications may be made to the above-described embodiments, the elements of which are to be understood as being among other acceptable examples. All such modifications and variations are intended to be included herein within the scope of this disclosure. The foregoing description details certain embodiments of the disclosure. It will be appreciated, however, that no matter how detailed the foregoing appears in text, the invention can be practiced in many ways. As is also stated above, the use of particular terminology when describing certain features or aspects of the disclosure should not be taken to imply that the terminology is being re-defined herein to be restricted to including any specific characteristics of the features or aspects of the invention with which that terminology is associated.

Conditional language, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
  an electronic display configured to display items of textual information, the items of textual information including one or more headings;
  a microphone configured to receive audio input from a user of the computing system;
  one or more computer processors in communication with the electronic display and the microphone and configured to execute software instructions; and
  one or more storage devices in communication with the one or more computer processors and storing a rule set and software instructions, the rule set defining at least one action to perform on textual information in response to an audio command received from the user, the software instructions configured for execution by the one or more computer processors in order to cause the system to:
    display, on the electronic display, the items of textual information to the user;
    receive, from the user via the microphone, an audio input including at least the audio command and an audio heading identifier;
    in response to receiving the audio command and the audio heading identifier, determine, based on the rule set, a first item of textual information included in the items of textual information displayed to the user on the electronic display following a heading associated with the audio heading identifier;
    in response to receiving the audio command and the audio heading identifier, automatically perform, based on the rule set, at least one selected from selecting the first item of textual information for receiving replacement text from the user and deleting the first item of textual information;

receive, from the user via the microphone, a second audio input including at least the audio command and an audio subheading identifier;

in response to receiving the audio command and the audio subheading identifier included in the second audio input, determine, based on the rule set, a second item of textual information following a subheading associated with the audio subheading identifier; and select, based on the rule set, the second item of textual information.

2. The computing system of claim 1, wherein the rule set includes heading identification rules, and wherein the heading associated with the audio heading identifier is determined based on the heading identification rules.

3. The computing system of claim 1, wherein the rule set includes text selection rules, and wherein the first item of textual information is determined based on the text selection rules.

4. The computing system of claim 3, wherein the first item of textual information includes one or more subheadings.

5. The computing system of claim 4, wherein the software instructions are further configured to cause the system to:
in response to the first item of textual information being deleted or replaced, position a cursor at a beginning of a previous location of the first item of textual information.

6. The computing system of claim 5, wherein the items of textual information comprise a medical report.

7. The computing system of claim 4, wherein the rule set includes selected text action rules, and wherein the software instructions are further configured to cause the system to:
in response to determining, based on the selected text action rules, that the first item of textual information is to be deleted or replaced:
determine the one or more subheadings and textual information associated with each of the one or more subheadings; and
delete or replace the textual information associated with each of the one or more subheadings but not the one or more subheadings.

8. The computing system of claim 1, wherein the rule set includes selected text action rules, and wherein the software instructions are further configured to cause the system to:
in response to determining, based on the selected text action rules, that the second item of textual information is to be deleted or replaced, delete or replace the second item of textual information; and
in response to determining, based on the selected text action rules, that the second item of textual information is to be replaced, replace the second item of textual information.

9. A computer-implemented method comprising:
under direction of one or more hardware processors configured with specific software instructions,
receiving, from a user interacting with a textual record including one or more nodes, an input including an audio command and a node identifier; and
in response to receiving the input:
identifying, based on the node identifier, a node of the textual record associated with the node identifier;
determining a portion of the textual record related to the identified node;
performing, based on the audio command and a rule set defining at least one action to perform on textual information in response to the audio command, at least one selected from selecting the portion of the textual record for receiving replacement text from the user and deleting the portion of the textual record;
receiving, from the user interacting with the textual record, a second input including the audio command and a subnode identifier; and
in response to receiving the second input:
identifying, based on the subnode identifier, a subnode of the textual record associated with the subnode identifier;
determining a second portion of the textual record related to the identified subnode; and
selecting the second portion of the textual record.

10. The computer-implemented method of claim 9, wherein determining the portion of the textual record is based on one or more selection rules, and wherein the one or more selection rules include at least one of: a rule useable to identify a node, a rule useable to identify a start point and end point of the portion of the textual record, or an action to take with respect to the portion of the textual record.

11. The computer-implemented method of claim 9, wherein a cursor is placed at a previous location of the deleted portion of the textual record after the portion of the textual record is deleted.

12. The computer-implemented method of claim 9, wherein the textual record further includes one or more subnodes, and wherein the portion of the textual record includes a subnode.

13. The computer-implemented method of claim 9, wherein the one or more nodes comprise headings in a medical report.

14. A non-transitory computer-readable storage medium storing computer-executable instructions that, when executed by a computer system, configure the computer system to perform operations comprising:
displaying, on an electronic display, a textual record including one or more nodes and one or more subnodes;
receiving, from a user interacting with the textual record, an input including an audio command and a identifier; and
in response to receiving the input:
identifying, based on a set of rules and the identifier, a node or subnode of the textual record associated with the identifier;
determining a portion of the textual record related to the identified node or subnode;
performing, based on the rule set and the audio command, at least one selected from selecting the portion of the textual record for receiving replacement text from the user and deleting the portion of the textual record, the rule set defining at least one action to perform on textual information in response to the audio command;
receiving, from the user interacting with the textual record, a second input including the audio command and a subnode identifier; and
in response to receiving the second input:
identifying, based on the subnode identifier, a subnode of the textual record associated with the subnode identifier;

determining a second portion of the textual record related to the identified subnode; and
selecting the second portion of the textual record.

15. The non-transitory computer-readable storage medium of claim 14, wherein the set of rules includes a first subset of rules usable for identifying a node and a second subset of rules usable for identifying a subnode.

16. The non-transitory computer-readable storage medium of claim 14, wherein the identified node or subnode is associated with a plurality of respective subnodes or sub-subnodes, and wherein the computer system is further configured to perform operations comprising, in response to receiving the audio command:
  selecting a particular one of the plurality of respective subnodes or sub-subnodes associated with the identified node or subnode;
  determining a portion of the textual record related to the selected one of the plurality of respective subnodes or sub-subnodes; and
  selecting the portion of the textual record related to the selected one of the plurality of respective subnodes or sub-subnodes.

17. A computer-implemented method comprising:
  under direction of one or more hardware processors configured with specific software instructions,
    displaying, on an electronic display, a textual record including one or more nodes and one or more subnodes;
    receiving, from a user interacting with the textual record, an input including an audio command, a node identifier, and a subnode identifier; and
    in response to receiving the input:
    identifying, based on the node identifier, a node of the textual record associated with the node identifier;
    identifying, based on the subnode identifier, a subnode of the identified node, the subnode associated with the subnode identifier;
    determining a portion of the textual record related to the identified subnode;
    performing, based on the audio command and a rule set, at least one selected from selecting the portion of the textual record for receiving replacement and deleting the portion of the textual record, the rule set defining at least one action to perform on textual information in response to the audio command;
    receiving, from the user, a second input including the audio command and a second subnode identifier; and
    in response to receiving the second command:
      identifying, based on the second subnode identifier, a second subnode of the identified node, the second subnode associated with the second subnode identifier; and
      determining a second portion of the textual record related to the identified second subnode.

18. The computer-implemented method of claim 17, wherein the portion of the textual record is determined based on a set of rules including criteria from identifying nodes, subnodes, and portions of the textual record associated with subnodes.

19. The computer-implemented method of claim 17, wherein the textual record contains a third subnode of a second node having a same identifier as the identified second subnode.

20. The computer-implemented method of claim 17 further comprising:
  under direction of the one or more hardware processors configured with specific software instructions,
    receiving, from the user, a third input including the audio command and a second subnode identifier; and
    in response to receiving the audio command and determining, based on the second subnode identifier, that no second subnode of the identified node exists that is associated with the second subnode identifier:
      identifying, based on the second subnode identifier, a third subnode of a node different from the identified node, the third subnode associated with the second subnode identifier; and
      determining a second portion of the textual record related to the identified third subnode.

* * * * *